United States Patent
Zee et al.

(10) Patent No.: US 8,131,305 B2
(45) Date of Patent: Mar. 6, 2012

(54) METHOD AND A NETWORK CONTROL NODE FOR BANDWIDTH AND ACCESS CONTROL IN FEMTO CELLS OF A WIRELESS SYSTEM

(75) Inventors: Oscar Zee, Kista (SE); Tomas Nylander, Varmdo (SE); Jari Vikberg, Jarna (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 240 days.

(21) Appl. No.: 12/674,623

(22) PCT Filed: Aug. 27, 2007

(86) PCT No.: PCT/SE2007/050582
§ 371 (c)(1),
(2), (4) Date: Feb. 22, 2010

(87) PCT Pub. No.: WO2009/029009
PCT Pub. Date: Mar. 5, 2009

(65) Prior Publication Data
US 2011/0039566 A1   Feb. 17, 2011

(51) Int. Cl.
*H04W 72/00* (2009.01)
*H04W 4/00* (2009.01)
(52) U.S. Cl. ....................... 455/450; 370/341
(58) Field of Classification Search ............. 455/450, 455/436, 422.1, 403, 410; 370/328, 329, 370/390, 254, 252, 468, 341; 725/116, 110, 725/53, 133, 62, 118, 31, 162, 115
See application file for complete search history.

(56) References Cited

U.S. PATENT DOCUMENTS

| | | | | |
|---|---|---|---|---|
| 5,995,487 A | * | 11/1999 | Weaver et al. | 370/395.21 |
| 8,018,934 B2 | * | 9/2011 | Liu | 370/390 |
| 8,028,057 B2 | * | 9/2011 | David | 709/223 |
| 8,068,450 B2 | * | 11/2011 | Kozisek | 370/328 |

(Continued)

FOREIGN PATENT DOCUMENTS

| WO | WO 2007/040449 A1 | 4/2007 |
|---|---|---|
| WO | WO 2007/136339 A2 | 11/2007 |

OTHER PUBLICATIONS

International Search Report dated Jun. 26, 2008 (5 pages).
Written Opinion dated Jun. 26, 2008 (4 pages).

(Continued)

*Primary Examiner* — Melody Mehrpour
(74) *Attorney, Agent, or Firm* — Myers Bigel Sibley & Sajovec, P.A.

(57) ABSTRACT

The present invention relates to a method and a network control node in a wireless communications system, for controlling bandwidth and controlling access in a femto cell. According to the method of the present invention, information on an available bandwidth measured between a femto RBS serving the femto cell, and a network node, is determined and provided to the network control node. Information on a bandwidth purchased by at least one subscribing user in the femto cell is also acquired at the network control node. The method further comprises calculating in the network control node and based on the provided information, a bandwidth that the wireless network can provide to non-subscribing users in the femto cell and further controlling the bandwidth and controlling access in the cell based in the calculated bandwidth.

18 Claims, 9 Drawing Sheets

U.S. PATENT DOCUMENTS

| | | |
|---|---|---|
| 2004/0100990 A1* | 5/2004 | Chen et al. ............... 370/468 |
| 2007/0105568 A1 | 5/2007 | Nylander et al. |
| 2008/0175188 A1* | 7/2008 | Kozisek ............... 370/328 |
| 2009/0196231 A1* | 8/2009 | Giaretta et al. ............ 370/328 |
| 2009/0300673 A1* | 12/2009 | Bachet et al. ............ 725/31 |
| 2011/0099587 A1* | 4/2011 | O'Neil ............... 725/62 |

OTHER PUBLICATIONS

L. Ho, "Effects of User-Deployed, Co-Channel Femtocells on the Call Drop Probability in a Residential Scenario", The 18$^{th}$ Annual IEEE International Symposium on Personal, Indoor, and Mobile Radio Communications (PIMRC'07), 2007, ISBN 1-4244-1143-2, printed on Feb. 22, 2010 (5 total pages).

* cited by examiner

METHOD AND A NETWORK CONTROL NODE FOR BANDWIDTH AND ACCESS CONTROL IN FEMTO CELLS OF A WIRELESS SYSTEM

TECHNICAL FIELD

The present invention relates generally to the field of wireless communications, and, more specifically, to a method, and network nodes for controlling bandwidth and controlling access in femto cells of a wireless system.

BACKGROUND

Wireless access networks have become a key element of a variety of telecommunications network environments. As to enterprise network environments, they provide convenient wireless access to network resources for employers or customers carrying laptops and/or mobile handheld devices. In addition, wireless access points operable with diverse communication devices, such as laptops, mobile phones, etc., are broadly used in public environment such as e.g., hotels, train stations, airports, restaurants, schools, universities and homes, and are mostly used to offer high-speed interne access.

The telecommunication industries and operators are currently investigating the possibility to further increase the coverage area offered by cellular communications network systems to home or small areas. Example of cellular communication network system are: the Universal Mobile Telecommunication Systems (UMTS) network, also known as third generation (3G) cellular network system or wideband code division multiplexing access (WCDMA); the Global System for Mobile telecommunications (GSM) network; the General Packet Radio Service (GPRS) network that utilizes the infrastructure of a GSM system; Two further examples of cellular access networks are EDGE and EGPRS which are further enhancements to GSM and GPRS. EDGE refers to enhanced Data rates for GSM Evolution, and EGPRS refers to EDGE for GPRS.

According to such investigation, a limited number of users (e.g. a user equipment (UE)) may be provided with e.g. WCDMA or 3G coverage using a small radio base stations (RBS) also called a "femto RBS" that would be connected to a radio network controller (RNC) of the 3G network using some kind of interne protocol (IP) based transmission. The coverage area so provided is called a "femto cell" to indicate that the coverage area is relatively small compared with an area of a macro cell. Other terminology for a femto RBS includes a "Home RBS" and/or a "pico RBS" and/or a "home 3G access point (H3GAP)" and/or a "micro RBS" and/or a "home access point (HAP)" and/or a "home Node B (HNB)".

One alternative for the IP based transmission is to use fixed broadband access (like xDSL, Cable, etc.) to connect the femto RBS to the RNC. Another alternative would be to use mobile broadband access e.g. HSDPA and enhanced uplink or some WiMAX technologies.

Figure 1:
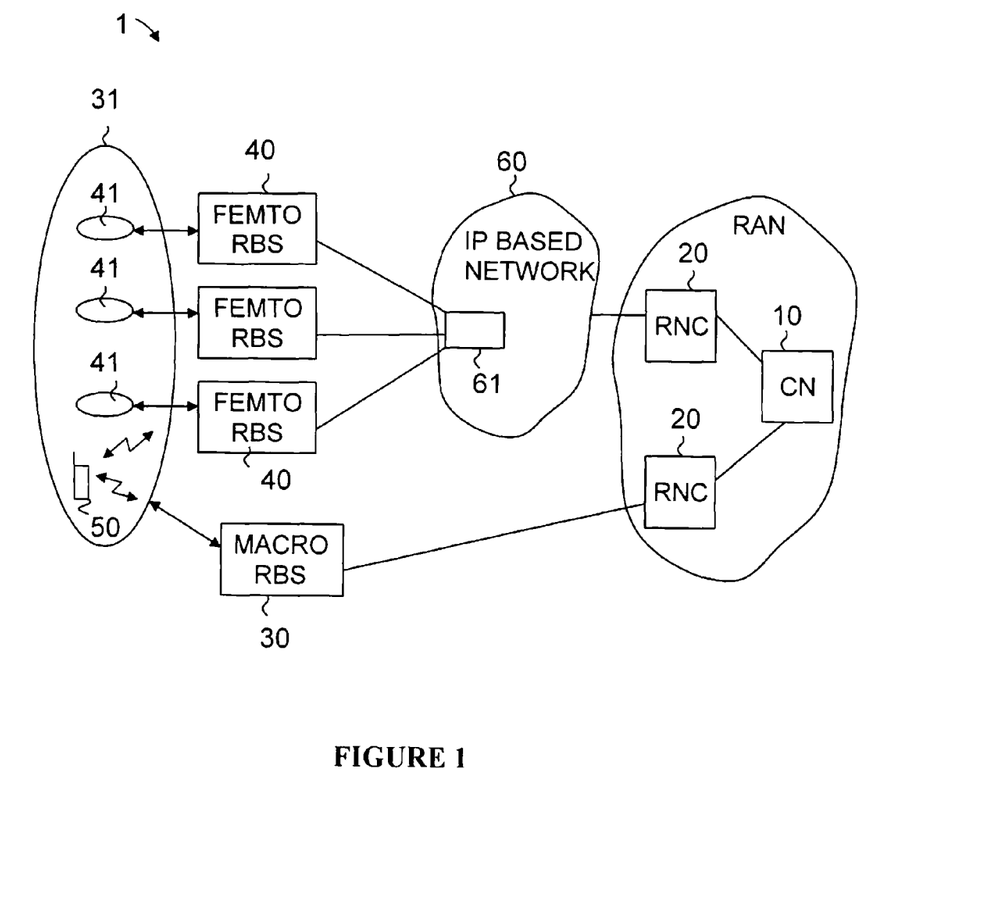
FIG. 1 is a block diagram illustrating an exemplary WCDMA wireless communications network including femto radio base stations in which the present invention may be used.

FIG. 1 illustrates an example of a WCDMA network 1 including femto RBSs 40 working as H3GAP. As shown, the network 1 comprises a core network (CN) 10 connected to one or more RNCs 20 that control all radio base stations connected to it, i.e. macro RBS 30 and femto RBSs 40. The macro RBS 30 serves a macro cell 31 whereas a femto RBSs 40 serves a femto cell 41. As illustrated, each femto RBS 40 serves its dedicated femto cell 41.

As well known in the art, a RBS is typically situated at an interior (e.g. center) of the respective cell which the RBS serves, but for the sake of clarity, the macro RBS 30 and the femto RBSs 40 of FIG. 1 are shown instead as being associated by double headed arrows to their respective cells. At least some of the femto cells 41 are geographically overlayed or overlapped by the macro cell 31.

A user equipment (UE) 50 communicates with one or more cells or one or more RBSs over a radio interface. A UE can be a mobile phone (or "cellular phone"), a laptop with mobile termination and thus can be e.g. portable, pocket, handheld, computer-included, or car-mounted mobile device which can communicate voice and/or data with a radio access network. The UE 50 my further communicate with the radio access network via a femto RBS 40 through an IP based transmission network 60 which, as described earlier, can be either broadband fixed IP based transmission (e.g. xDSL) or broadband mobile IP based transmission (e.g. WiMax).

In the WCDMA network depicted in FIG. 1, the transport network capacity (or bandwidth) between the macro RBS 30 and the RNC 20 is usually known in advance. The information on the network capacity may be used by an operator for e.g. congestion and admission control within the RNC 20. However, the network capacity (or bandwidth) between the femto RBS 40 and for example a network node 61 being either part of the IP network 60 or connected to the IP based network 60, is more unpredictable especially when thousands of femto RBSs may be deployed in the network making it more difficult to determine distances between femto RBSs and network nodes of the IP based network 60. Such IP network node may e.g. be a digital subscriber line access multiplexer (DSLAM) linking the femto RBS to the RNC. Thus, without knowledge of this network capacity, congestion and admission/access control within a femto cell served by a femto RBS is more difficult to achieve leading to unnecessary waste of resources and capacity in the femto cell.

SUMMARY

An object of the present invention is thus to obviate at least some of the above disadvantages by providing a procedure for performing congestion and admission/access control within a femto cell served by a femto RBS in order to improve the utilization and the control of a network capacity or bandwidth in femto cells.

According to a first aspect of the invention, the above stated problem is solved by means of a method of controlling bandwidth and controlling access in a femto cell served by a femto radio base station. The femto radio base station being connected to a wireless communications network. The method comprises: acquiring at a radio network control node of the wireless communications network information on an available bandwidth between the femto radio base station and a network node connected to the wireless communications network and acquire information on a bandwidth purchased by at least one subscribing user in the femto cell. The subscribing user may e.g. be a home user or an enterprise that owns or rents the femto RBS and that has e.g. a subscription to a IP broadband interne connection like ADSL, VDSL. ADSL2+ etc. or that has a subscription to a wireless IP broadband connection like WiMAX.

According to the first aspect of the present invention, the method further comprises calculating, based on the acquired information mentioned above, a bandwidth that the wireless communications network is able to provide, via the femto radio base station, to non-subscribing users in the femto cell. The method further comprises controlling the bandwidth and control access in the femto cell based on information on the calculated bandwidth. According to an embodiment of the present invention, bandwidth or capacity control in the femto cell may comprise admission control, congestion control and access right control of the femto radio base station of the femto cell.

According to another aspect of the present invention, the above stated problem is solved by means of a radio network control node of a wireless communications system, used for controlling bandwidth and controlling access in a femto cell served by a femto RBS being connected to the radio network control node via an IP network. According to the present invention, the radio network control node comprises acquiring means configured to acquire information on an available bandwidth that is measured between the femto RBS and a network node connected to the wireless communications network, and further configured to acquire information on a bandwidth purchased by at least one subscribing user in the femto cell. The radio network control node further comprises calculating means configured to calculate, based on the acquired information, a bandwidth that the wireless communications network, via the femto RBS, is able to provide to non-subscribing users in the femto cell; and further comprises controlling means configured to control the bandwidth and controlling access in the femto cell based on information on the calculated bandwidth.

The present invention will now be described in more details by means of several embodiments and with reference to the accompanying drawings, attention to be called to the fact, however, that the following drawings are illustrative only, and that various modifications and changes may be made in the specific embodiments illustrated as described within the scope of the appended claims.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

The present invention is described herein by way of reference to particular example scenarios. In particular the invention is described in a non-limiting general context in relation to a WCDMA wireless communications network including femto radio base stations that are connected to a radio network control node i.e. a radio network controller (RNC) of the WCDMA wireless network via a fixed IP based broadband access network, e.g. xDSL.

Figure 2:
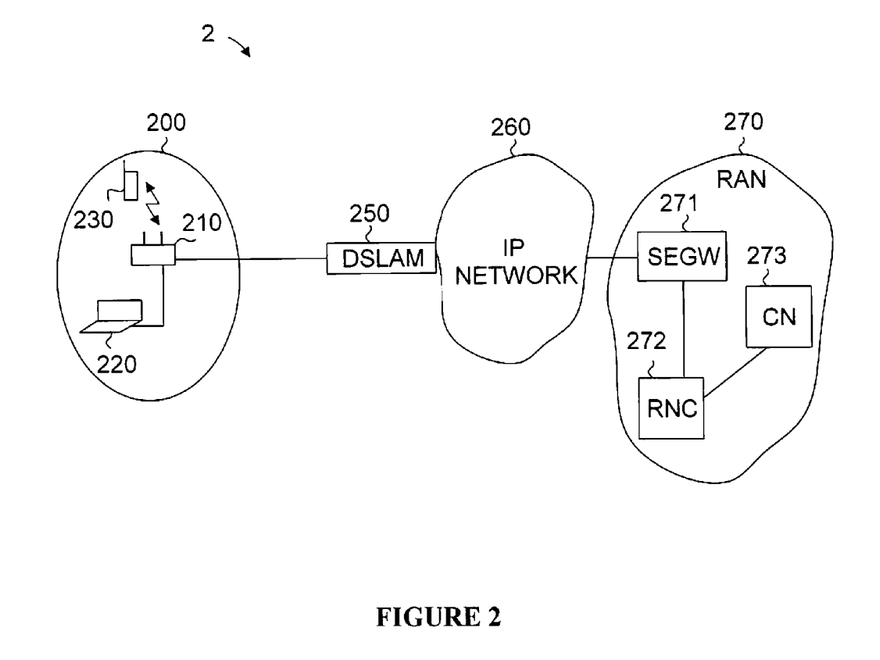
FIG. 2 schematically illustrates a wireless network in which the present invention may be used, including one femto RBS serving subscribing users.

FIG. 2 illustrates such an exemplary WCDMA wireless network 2. However and for sake of simplicity only a single femto radio base station (femto RBS) 210 is illustrated. A femto cell (i.e. home/office) 200 is served by the femto RBS 210. The femto RBS 210 is aimed to be used by users of the home or enterprise/office where it is located. The femto RBS 210 is further integrated into the wireless WCDMA network 2 and thus shares the radio frequency spectrum (or part of it) allocated to the wireless WCDMA network. A user equipment (UE) 230 can thus roam from the femto cell 200 to another macro radio cell when leaving the coverage of the femto RBS 210, or can roam to the femto cell 200 from another macro cell (not shown) when located in the vicinity of the femto RBS 210. The femto RBS 210 may further be equipped with a connection for an Ethernet local area network within the home/enterprise and can therefore connect to one or several personal computers 220 over the Ethernet. A personal computer 220 that is connected to the femto RBS 210 is also, in this context, referred to as a UE 220. The femto RBS 210 may further be equipped with or is connected locally in the femto cell, to an xDSL (e.g. ADSL, VDSL, ADSL2+, etc.) customer premise equipment (CPE) (not shown) which has a function of a multi-mode modem, thus enabling it to provide IP connection over an IP network 260, to the wireless network using a digital subscriber line (DSL).

As shown in FIG. 2, the IP network 260 is connected to a digital subscriber line access multiplexer (DSLAM) 250 linking the femto RBS (or the femto RBS and the CPE) to the IP network and further to at least one network node of a radio access network. As an example, the DSLAM 250 may be connected to a security gateway (SEGW) 271 via the IP network 260. SEGW 271 usually provides: user authentication using Universal Subscriber Identity Module (USIM) information from e.g. UE 230; IP security (IPsec) tunnelling and encryption between a LIE and the SEGW, Firewall and distributed denial of service attack (DDoS protection; traffic bandwidth limiting to prevent theft of service and DoS attacks on core infrastructure etc. Also illustrated in FIG. 2 is a RNC 272 being connected to the SEGW 271. The RNC 272 is, in a wireless network, required for all RBSs services supporting e.g. WCDMA. The RNC 272 is further connected to the core network (CN) 273.

In FIG. 2, an end user having UE 220 or UE 230 maybe the owner of the femto RBS 210 and may also have purchased or subscribed to an xDSL (e.g. ADSL) fixed connection. A subscription to a fixed broadband connection usually includes the amount of bandwidth, in the uplink and in the downlink, which a subscribing user has purchased from a broadband network operator. As an example, a subscribing user may purchase an ADSL IP broadband connection that can offer 8 Mbps for the downlink bandwidth and 1.5 Mbps for the uplink bandwidth. A purchased IP bandwidth is referred to here as Purchased IP BW.

The subscribing user (UE 220 and/or UE 230) may further have purchased or subscribed for 3G traffic i.e. the user may have a subscription to get access to the wireless WCDMA network. A purchased bandwidth used by a subscribing user for 3G traffic is referred to here as Purchased 3G BW.

In the femto cell 200, a subscribing user may thus have access to both the broadband fixed ADSL IP network and to the 3G (or WCDMA) network via the femto RBS 210. In such case, a subscribing user has a purchased bandwidth, referred to here as Purchased BW, corresponding to the sum of Purchased IP BW and Purchased 3G BW, i.e.

$$\text{Purchased BW} = \text{Purchased IP BW} + \text{Purchased 3G BW} \qquad (1)$$

Hereinafter an exemplary embodiment of the present invention is described in conjunction with FIG. 3.

Figure 3:
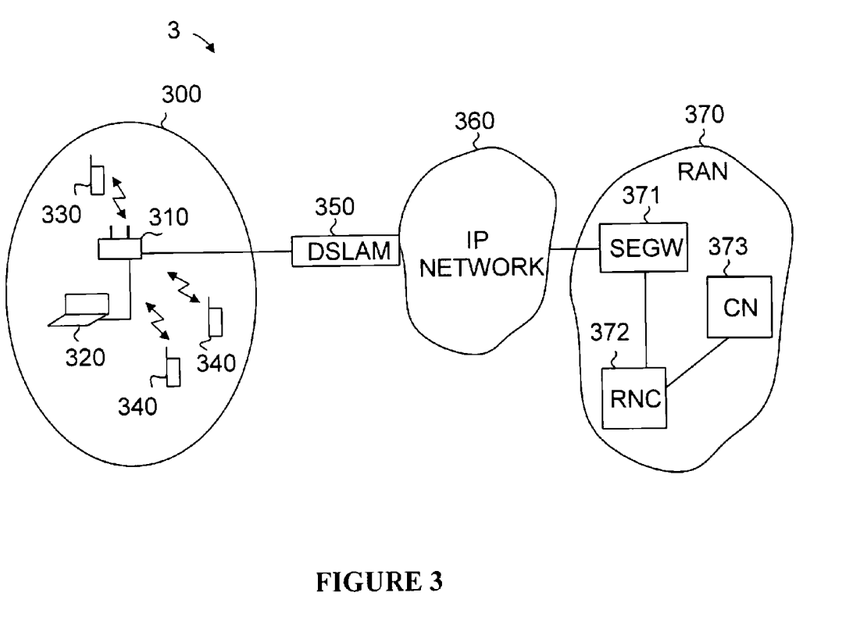
FIG. 3 schematically illustrates a wireless network in which the present invention may be used, comprising one femto cell in which are included subscribing and non-subscribing users.

As shown in FIG. 3, a network 3 comprises a femto cell 300 that is served by a femto RBS 310. The femto RBS 310 is here considered to be equipped with a CPE (not shown) or be connected locally in the femto cell 300 with a CPE. Therefore, when the femto RBS is herein referred to a femto RBS, the CPE is considered to be integrated in the femto RBS, whereas a femto RBS+CPE is herein referred to a femto RBS that is connected to a CPE, i.e. there exists a defined interface between the RBS and the CPE.

Referring back to FIG. 3, the femto RBS (or the femto RBS+CPE) is further connected to an IP network 360 via a DSLAM 350. In addition, the IP network 360 may further be connected to a SEGW 371 which in turn is connected to a RNC 372 of a RAN 370. The RNC 372 is further connected to a core network 373.

In the femto cell 300 of FIG. 3, UEs 320, 330 are considered to belong to a subscribing user that has purchased a bandwidth, Purchased BW, as previously expressed in equation (1). UEs 340 depicted in FIG. 3 are considered to belong to one or several non-subscribing users. UEs 330, 340 are in this context equipped with at least one interface that may be used to connect to the RAN 370. Thus in case RAN 370 is part of a WCDMA (or 3G) network, UEs are 3G (or WCDMA or UMTS) UEs. Note that UE 320, representing a computer, may also be equipped with a least one interface that may be used to connect to the RAN 370.

In normal cases, when non-subscribing users UEs 340 are attached to the femto RBS 310, the RAN 370 will check if UEs 340 are authorized to get access to the RAN via the femto RBS 310. In such case the UEs 340 are denied access to the RAN 370 since they belong to non-subscribing users. However and according to embodiments of the present invention, a bandwidth that the RAN 370 is able to provide to the non-subscribing users UEs 340 being attached to the femto RBS 310, is calculated and used to control the bandwidth and control access rights in the femto cell 300.

For this purpose and in accordance with a first exemplary embodiment of the present invention, information on an available bandwidth is first measured between the femto RBS 310 (or femto RBS 310+CPE) and the DSLAM 350. A transmission line test may therefore be performed, both in the downlink and in the uplink, between the femto RBS 310 (or femto RBS 310+CPE) and the DSLM 350 during initialization of the femto RBS 310 (or femto RBS 310+CPE), and an available bandwidth, denoted here DSL line BW, is thus measured. The measured DSL line BW is considered here to be the maximum available bandwidth between the femto RBS 310 (or femto RBS 310+CPE) and the DSLAM 350, which maybe limited by the transmission line quality and the distance between the femto RBS 310 (or femto RBS 310+CPE) and the DSLAM 350. Therefore, in a network wherein several (hundreds or thousands) femto RBSs are deployed, the DSL line BW measured between the different femto RBSs and the DSLAM are most probably different because of the varying distances between the different femto RBSs and the DSLAM in addition to the varying transmission line quality (ies).

Referring back to FIG. 3, upon determining/measuring the DSL line BW between the femto RBS 310 and the DSLAM 350, the DSL line BW may be, in accordance with the first exemplary embodiment of the present invention, stored in the femto RBS 310 (femto RBS 310+CPE).

As mentioned earlier, the subscribing user (UE 230) has purchased an IP bandwidth previously referred to as Purchased IP BW. This bandwidth corresponds to the purchased ADSL IP bandwidth. The information on the Purchased IP BW (on the uplink and on the downlink) is, according to the present exemplary embodiment of the present invention, stored in the DSLAM 350 and is provided to the femto RBS 310 (or the femto RBS 310+CPE) where it is stored. The femto RBS 310 (or the femto RBS 310+CPE) thus has information on the measured available bandwidth, corresponding to a first parameter DSL line BW and information on the subscribing user's IP ADSL bandwidth corresponding to a second parameter Purchased IP BW. Subsequently, and according to the first exemplary embodiment of the present invention, the RNC 372 is configured to acquire the first and second parameters (i.e. information on DSL line BW and Purchased IP BW) from the femto RBS 310 (or the femto RBS 310+CPE). Thus, the RNC 372 comprises acquiring means to acquire the first and second parameters from the femto RBS 310.

According to the first exemplary embodiment of the present invention, the RNC 372 comprises calculating means that is configured to use the first and second parameters to calculate a maximum bandwidth, referred to here as Max 3G BW, which the RAN 370 (or similarly the wireless 3G network) can provide via the femto RBS 310. The RNC 372 calculates and stores the Max 3G BW which is given by the following expression:

$$\text{Max 3G BW} = \text{DSL line BW} - \text{Purchased IP BW} \qquad (2)$$

As mentioned earlier, the subscribing user (UE 320) may further have purchased a bandwidth for 3G traffic, previously referred to as Purchased 3G BW. The information on the Purchased 3G BW is, according to this first exemplary embodiment of the present invention, acquired or retrieved by the RNC 372 from a network node in the RAN 370. The network node may for example be an access control database (ACDB) being located in the RAN 370 or may be the SEGW 371 or may be any other network node having knowledge of the Purchased 3G BW. According to this first exemplary embodiment of the present invention, the RNC 372 stores the information on the Purchased 3G BW and together with the previously calculated maximum bandwidth, Max 3G BW. the RNC 372 may determine/calculate how much bandwidth that can be allocated to the non-subscribing users UEs 340 in order to control the bandwidth and control the access right in the femto cell 300. As an exemplary embodiment of the present invention, the RNC 372 may determine the unallocated bandwidth, referred to here as Unallocated 3G BW using the following expression:

$$\text{Unallocated 3G BW} = \text{Max 3G BW} - \text{Purchased 3G BW} \qquad (3)$$

According to another exemplary embodiment of the present invention, the RNC 372 may send information on the Unallocated 3G BW and/or information on the Purchased 3G BW to the femto RBS 310 (or the femto RBS 310+CPE) and request it to limit the throughput of the subscribing user(s) (UE 330) to the Purchased 3G BW and to use the remaining bandwidth Unallocated 3G BW to the other users, i.e. to the non-subscribing users UEs 340. In case Max 3G BW is equal to or less than Purchased 3G BW, the non-subscribing users UEs 340 will be denied (or prohibited) by the RAN 370 (or the RNC 372) from getting access to the femto RBS 310 and thus only subscribing users UE 330 may be allowed to access to the 3G network via femto RBS 310.

It should be noted that in case there is an available bandwidth that can be allocated to the non-subscribing users UEs 340, i.e. the Unallocated 3G BW is not equal to zero, then an improved congestion control can be achieved in the femto cell 300 for the uplink data whereas the downlink data and non-uplink data are here considered to still be controlled by the RNC 372. This is because the subscribing users UE 330, in the femto cell 300, are only allowed to use Purchased 3G BW for 3G traffic, whereas the non-subscribing users UEs 340 are only allowed to use Unallocated 3G BW for 3G traffic. I It obvious from equation (3) above that in case user UE 330 does not have a Purchased 3G BW i.e. Purchased 3G BW is equal to zero then the bandwidth that the RNC 371 can, via the femto RBS 310, allocate to users in the femto cell 300, corresponds to the maximum available 3G bandwidth i.e. Max 3G BW. Thus, all UEs 320, 330, 340 in the femto cell may be allowed by the RNC 372 to get access to the wireless 3G network via the femto RBS 310.

Figure 4:
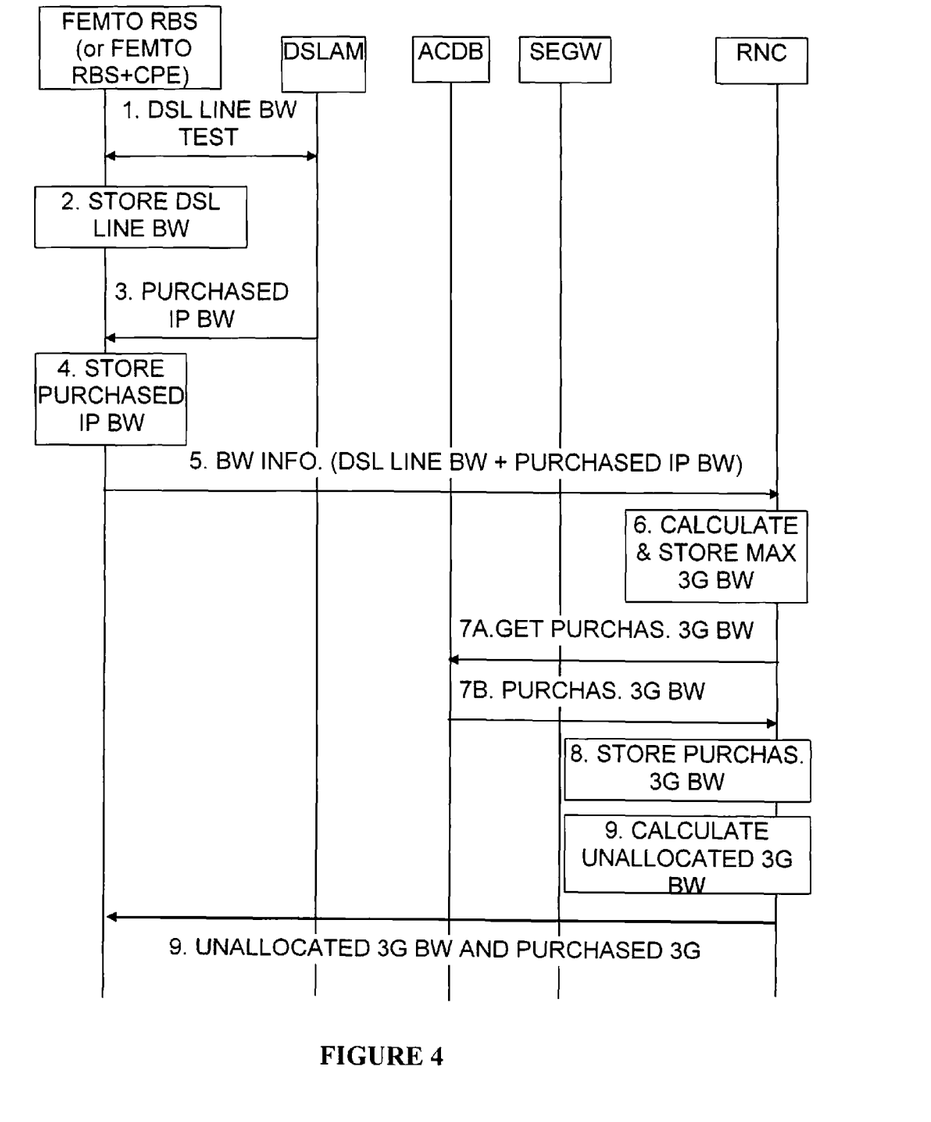
FIG. 4 illustrates signalling messages according to a first exemplary embodiment of the present invention.

Referring to FIG. 4 there is illustrated signalling messages in accordance with the above described method for controlling bandwidth and controlling access in a femto cell according to the first exemplary embodiment of the present invention.

In step 1, a DSL line BW test is performed (both on the uplink and on the downlink), between the femto RBS (or the femto RBS+CPE) and the DSLAM whereby a DSL line BW is measured.

In step 2, information on the DSL line BW is stored in the femto RBS (or in the femto RBS+CPE).

In step 3, information on a purchased ADSL IP bandwidth (both for the uplink and for the downlink), previously referred to as Purchased IP BW is provided from the DSLAM to the femto RBS (or the femto RBS+CPE).

In step 4, information on the Purchased IP BW is stored in the femto RBS (or the femto RBS+CPE).

In step 5, the femto RBS (or the femto RBS+CPE) provides the RNC with information on the DSL line BW and information on the Purchased IP BW.

In step 6, the RNC calculates, using equation (2), a maximum bandwidth, previously referred to as Max 3G BW, which the radio access network can provide via the femto RBS to users in the femto cell. The RNC also stores the information on the Max 3G BW.

In step 7A, information on a purchased bandwidth for 3G traffic i.e. Purchased 3G BW, is requested by the RNC from the ACDB.

In step 7B, the ACDB responds with the information on Purchased 3G BW.

In step 8, the RNC stores the information on Purchased 3G BW. This information is used by the RNC for congestion and admission control of data on the downlink for the subscribing user(s).

In step 9, the RNC uses stored information i.e. Max 3G BW and Purchased 3G BW and may calculate a bandwidth, previously referred to as Unallocated 3G BW, which can be allocated to non-subscribing users UEs in the femto cell. The RNC then informs the femto RBS (or the femto RBS+CPE) of the Unallocated 3G BW and of the Purchased 3G BW and requests it to limit the throughput of the subscribing user(s) to the Purchased 3G BW and to use the remaining bandwidth. i.e. Unallocated 3G BW, to the other users, i.e. to the non-subscribing users UEs. As mentioned earlier, admission/access and congestion control is thus achieved in the femto cell, i.e. admission/congestion control for the uplink data for both subscribing and non-subscribing users in the femto cell.

Figure 5A:
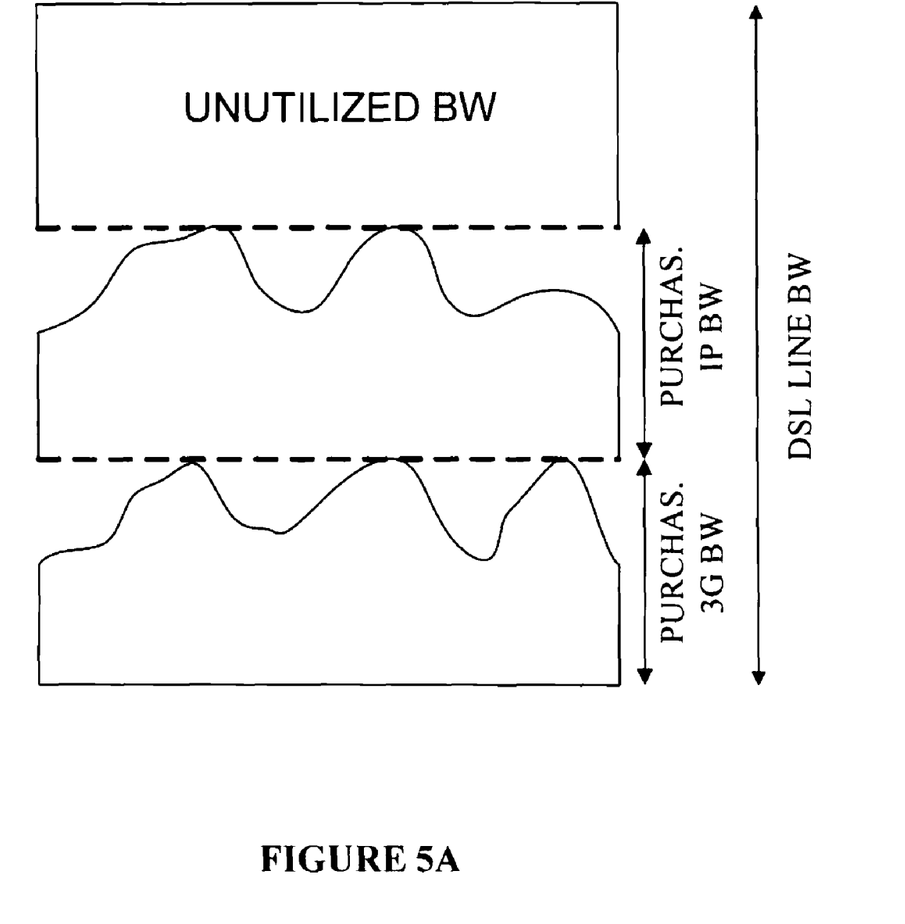
FIG. 5A is a graph showing prior art bandwidth utilization in a femto cell.

FIG. 5A is a graph showing prior art bandwidth utilization in a femto cell i.e. wherein the present invention according to the above described first exemplary embodiment is not implemented.

Figure 5B:
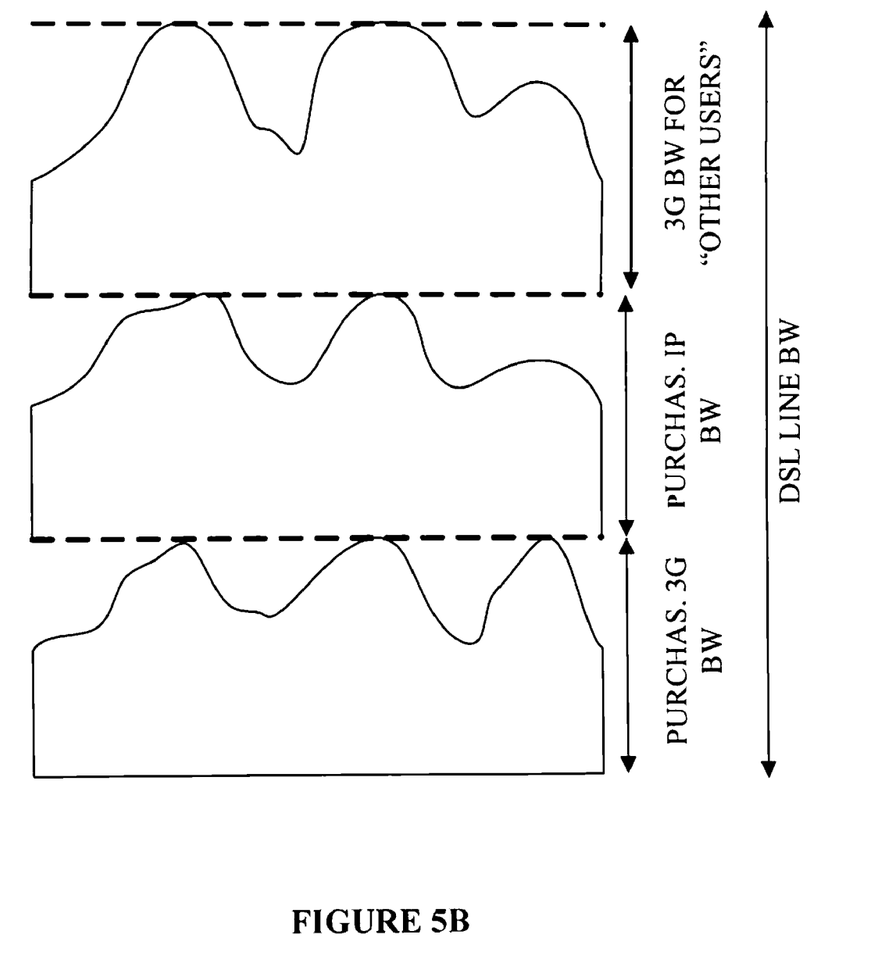
FIG. 5B is a graph showing an example of the bandwidth utilization in a femto cell, in accordance with a first exemplary embodiment of the present invention.

FIG. 5B is a graph illustrating bandwidth utilization in a femto cell, in accordance with the first exemplary embodiment of the present invention.

It is clear from FIG. 5B, that the present invention according to its first exemplary embodiment provides improved bandwidth utilization over prior art since Unallocated 3G BW may be allocated to the non-subscribing users in the femto cell. In FIG. 5B, the Unallocated 3G BW is denoted 3G BW for "other users".

Figure 6A:
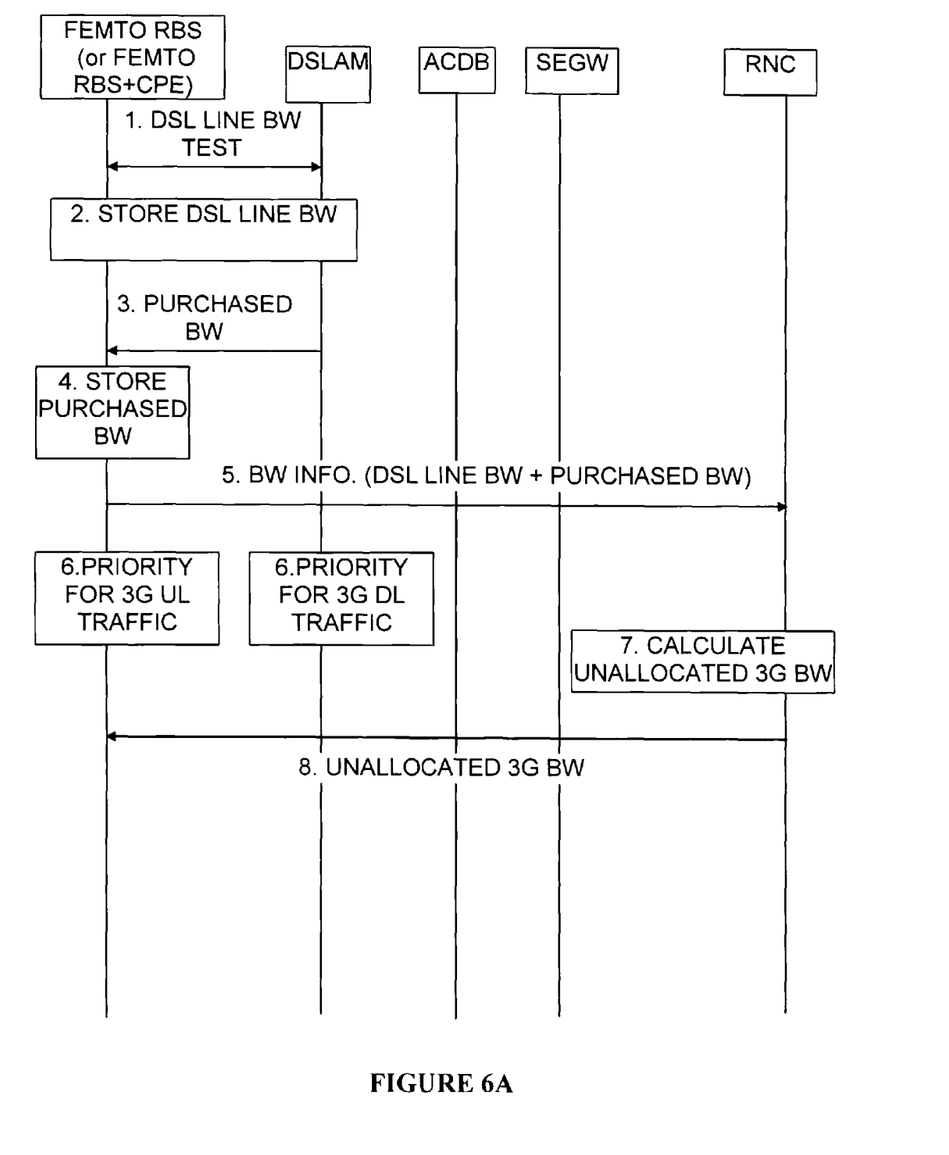
FIG. 6A illustrates signalling messages according to a second exemplary embodiment of the present invention.

Referring to FIG. 6A there is illustrated signalling messages in accordance with a method for controlling bandwidth and controlling access in a femto cell according to the second exemplary embodiment of the present invention.

In step 1, a DSL line BW test is performed (both on the uplink and on the downlink), between the femto RBS (or the femto RBS+CPE) and the DSLAM whereby a DSL line BW is measured. In this second exemplary embodiment of the present invention, the DSLAM and the femto RBS (or the femto RBS+CPE) are assumed to have knowledge about the parameter Purchased IP BW and therefore may determine the parameter Max 3G BW using equation (2).

In step 2, the information on the measured bandwidth (DSL line BW) is stored in the femto RBS (or femto RBS+CPE) and in the DSLAM.

In step 3, the DSLAM is according to the present exemplary embodiment of the present invention, assumed to have knowledge of the purchased bandwidth (Purchased BW) which, as previously described in conjunction with equation (1), is the combination of the Purchased IP BW and Purchased 3G BW, i.e. Purchased IP BW and Purchased 3G BW are merged together into a single parameter Purchased BW. The DSLAM in step 3 sends information on Purchased BW to the femto RBS (or femto RBS+CPE).

In Step 4, the femto RBS (or femto RBS+CPE) stores information on the Purchased BW In step 5, the femto RBS (or femto RBS+CPE) provides the RNC with information on the measured DSL line BW and information on the Purchased BW.

In step 6, a priority function may be implemented in the femto RBS (or femto RBS+CPE) and in the DSLAM to prioritize 3G traffic before the IP traffic as will be described.

In step 7, the RNC may store the information on Purchased BW and information on DSL line BW and then calculates the amount of bandwidth, Unallocated 3G BW, which can be allocated to non-subscribing users UEs in the femto cell. Unallocated 3G BW is however calculated according to the following expression:

$$\text{Unallocated 3G BW} = \text{DSL line BW} - \text{Purchased BW} \quad (5)$$

In step 8, and similarly to the previously described embodiment of the present invention, the RNC may inform the femto RBS (or the femto RBS+CPE) of the Unallocated 3G BW and requests it to limit the throughput of the non-subscribing users to the Unallocated 3G BW. As mentioned earlier, admission/access and congestion control is thus achieved in the femto cell.

Concerning the prioritization of the traffic mentioned above, the femto RBS (or the femto RBS+CPE) uses the information on Purchased BW and information on DSL line BW for prioritization on the uplink traffic according to the following exemplary priority:
  3G traffic for subscribing user(s) (up to Purchased BW)
  IP traffic for subscribing user(s) (Purchased BW−Purchased 3G BW)
  3G traffic for non-subscribing user(s) (DSL line BW−Purchased BW given in equation (5)).

In the DSLAM, prioritization on downlink 3G traffic (i.e. provided from the wireless WCDMA network) is according to the following exemplary priority:
  3G traffic for subscribing user(s)
  IP traffic for subscribing user(s).

Referring back to step 8 above, the bandwidth limitation imposed in the RNC on the downlink traffic may have the following priority:
  3G traffic for subscribed user(s) (up to Purchased BW)
  3G traffic for unsubscribed user(s) (up to Unallocated 3G BW).

Thus, admission/access and congestion control is achieved in the femto cell, i.e. admission/congestion control for the uplink data for both subscribing and non-subscribing users in the femto cell.

Figure 6B:
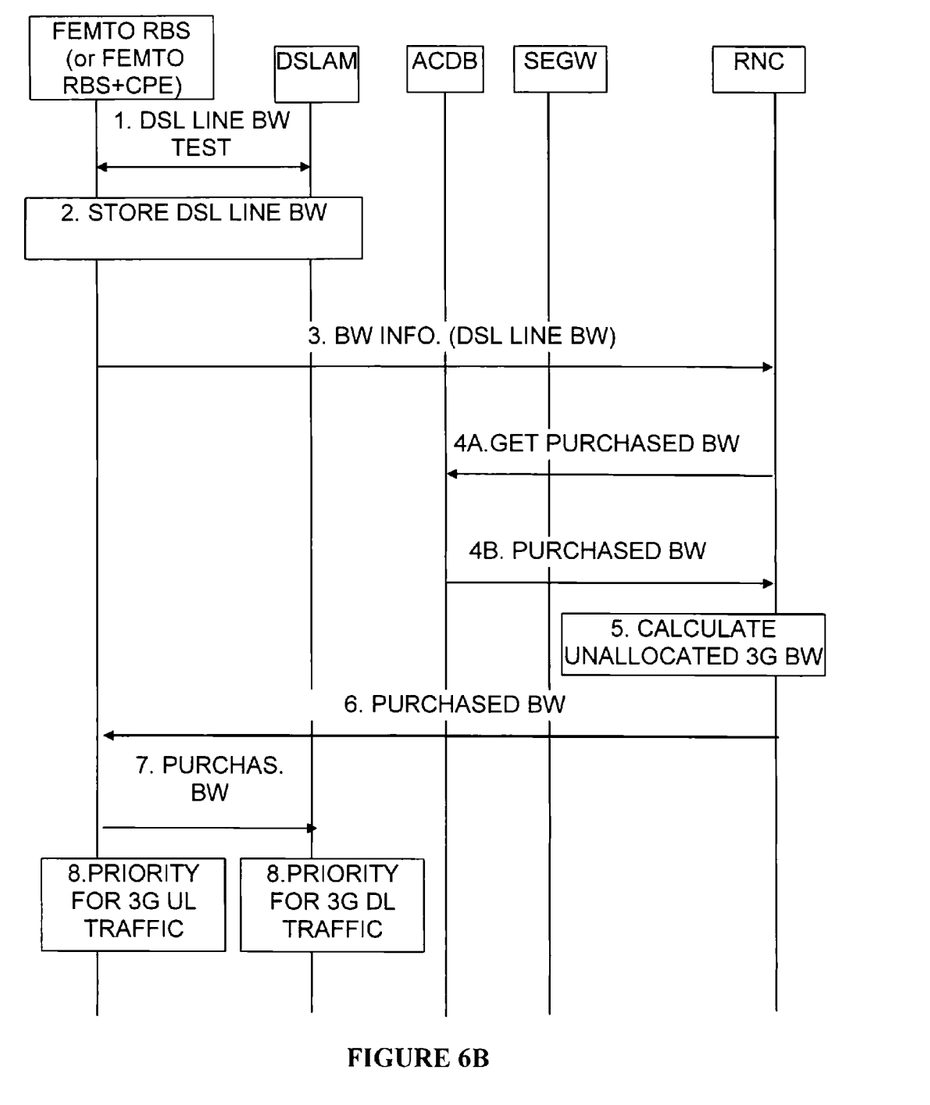
FIG. 6B illustrates signalling messages according to a yet another exemplary embodiment of the present invention.

Referring to FIG. 6B there is illustrated signalling messages in accordance with a method for controlling bandwidth and controlling access in a femto cell according to yet another exemplary embodiment of the present invention.

In step 1, similarly to the previously described embodiments of the present invention, a DSL line BW test is performed (both on the uplink and on the downlink), between the femto RBS (or the femto RBS+CPE) and the DSLAM whereby a DSL line BW is measured. Again, the DSLAM and the femto RBS (or the femto RBS+CPE) are assumed to have knowledge about the parameter Purchased IP BW and therefore may determine the parameter Max 3G BW using equation (2).

In step 2, the information on the measured bandwidth (DSL line BW) is stored in the femto RBS (or femto RBS+CPE) and in the DSLAM.

In step 3, the information on DSL line BW is provided by the femto RBS (or femto RBS+CPE) to the RNC.

In Step 4A, information on Purchased BW (i.e. as given in equation (1)) is requested by the RNC from the ACDB which is assumed to have knowledge of both Purchased IP BW and Purchased 3G BW and thus merges the two parameters into Purchased BW.

In Step 4B, the ACDB responds with the requested information on information on Purchased BW.

In step 5, The RNC calculates Unallocated 3G BW based on the information received from the ACDB and information provided by the femto RBS (or femto RBS+CPE). Unallocated 3G BW is calculated using equation (5).

In step 6, the RNC may inform the femto RBS (or the femto RBS+CPE) of the Purchased BW. In this exemplary embodiment of the present invention, Purchased BW which was assumed stored in the RAN (i.e the ACDB), is to be informed to the fixed IP network (i.e. the DSLAM).

In step 7, according to this exemplary embodiment of the present invention. Purchased BW which was assumed stored in the RAN (i.e the ACDB), is to be informed to the fixed IP network (i.e. the DSLAM). Therefore, Purchased BW is provided to the DSLAM.

In step 8, a priority function may be implemented in the femto RBS (or femto RBS+CPE) and in the DSLAM to prioritize 3G traffic before the IP traffic as already described in conjunction with the second exemplary embodiment of the present invention. In addition, bandwidth limitation is also similar to the one described earlier in conjunction with the second exemplary embodiment of the present invention.

Thus, admission/access and congestion control is achieved in the femto cell, i.e. admission/congestion control for the uplink data for both subscribing and non-subscribing users in the femto cell.

It should be mentioned that in the above described embodiments of the present invention the information that the femto RBS (or femto RBS+CPE) provides to the RNC may be sent using audit procedure in a protocol known as NBAP (Node B Application protocol, or via NBAP as a private message. Furthermore, the information that the RNC provides to the femto RBS (or femto RBS+CPE) may be sent via cell setup in NBAP or via NBAP (private message). It should also be noted that any other suitable protocol may also be used for the signalling illustrated in FIGS. 4, 6A and 6B and the present invention is therefore not restricted to any particular protocol.

Figure 7:
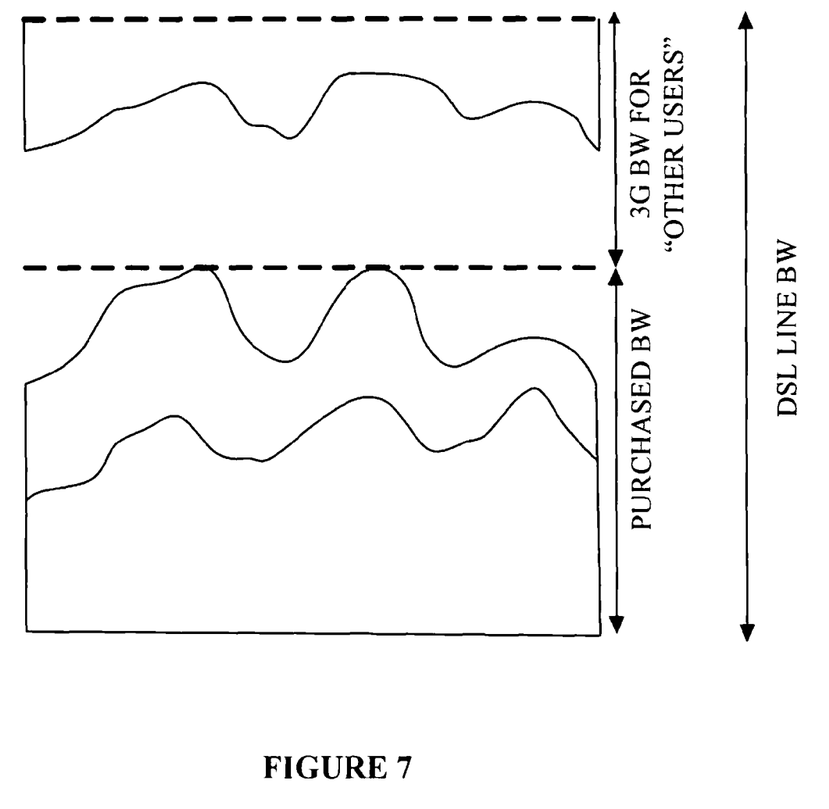
FIG. 7 is a graph showing an example of the bandwidth utilization in a femto cell, in accordance with the other exemplary embodiments of the present invention.

FIG. 7 is a graph illustrating an example of bandwidth utilization in a femto cell, in accordance with the exemplary embodiments of the present invention described above wherein Purchased IP BW and Purchased 3G BW are merged into one single parameter, Purchased BW. It is also clear from FIG. 7, that the present invention according to its exemplary embodiments provides improved bandwidth utilization over prior art (FIG. 5A).

With the present invention and it described exemplary embodiments, the utilization off the capacity/throughput/bandwidth in a network comprising femto cells that are served by femto radio base stations, is improved by providing separate bandwidth control between home users, e.g. subscribing users, and other users, e.g. non-subscribing users and by achieving an improved access and congestion control in the femto cells.

It is noted that whilst embodiments of the present invention have been described in relation to network scenario including a WCDMA radio network being connected to an IP xDSL network, embodiments of the proposed solution can be used in any other network scenario e.g. a GSM network, a LTE network and/or a WiMAX network that can be connected to an IP network. Furthermore, the present invention is not restricted to an xDSL IP network. As an example, a regular E1/T1/J1 link of a cable network or a cable TV network may be used instead of an xDSL line.

In addition, the present invention and its embodiments can be realised in many ways. For example, one embodiment of the present invention includes a computer-readable medium having instructions stored thereon that are executable by a computer system located in one or several network nodes of the communication system, for controlling bandwidth and controlling access. The instructions executable by the computing system and stored on the computer-readable medium perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method of controlling bandwidth and controlling access in a femto cell served by a femto radio base station (RBS), said femto RBS being connected to a wireless communications network, the method comprising:

acquiring, at a radio network control node of the wireless communications network, information on an available bandwidth measured between the femto RBS and a network node connected to the wireless communications network, and information on a bandwidth purchased by at least one subscribing user in the femto cell;

calculating, in said radio network control node (272, 372), based on the acquired information, a bandwidth that the wireless communications network, via the femto RBS, is able to provide to non-subscribing users in the femto cell;

controlling the bandwidth and controlling access in the femto cell based on the calculated bandwidth.

2. The method according to claim 1, further comprising:
connecting said femto RBS to said wireless communications network via an Internet Protocol (IP) network.

3. The method according to claim 1, where said available bandwidth is measured between said femto RBS, being equipped with or connected to a customer premise equipment (CPE) in said femto cell, and said network node that is connected to the wireless communications network.

4. The method according to claim 2, where said acquiring said information on the purchased bandwidth comprises:
acquiring at least information on an Internet Protocol (IP) bandwidth purchased by said at least one subscribing user to get access to said IP network.

5. The method according to claim 1, further comprising:
acquiring, by said radio network control node, said information on the available bandwidth and the information on the purchased IP bandwidth, from the femto RBS.

6. The method according to claim 5, where the calculating comprises:
calculating the bandwidth that the wireless communications network is able to allocate to users in the femto cell, in said radio network control node, by taking a difference between the measured available bandwidth and the purchased bandwidth.

7. The method according to claim 6, further comprising:
requesting, by said radio network control node in the wireless communications network from another network node or from an access control database (ACDB) node of the wireless communications network, the information on the bandwidth purchased by said at least one subscribing user to get access, via the femto RBS, to the wireless communications network.

8. The method according to claim 7, further comprising:
calculating, in said radio network control node, a bandwidth that can be allocated to the non-subscribing users by taking a difference between said bandwidth that the wireless communications network is able to allocate to users in the femto cell and said bandwidth purchased by said at least one subscribing user to get access, via the femto RBS, to the wireless communications network.

9. The method according to claim 8, further comprising:
transmitting from the network control node to the femto RBS, said calculated bandwidth and information on the bandwidth purchased by said at least one subscribing user to get access, via the femto RBS, to the wireless communications network.

10. The method according to claim 9 where the controlling bandwidth comprises:
allocating the calculated bandwidth to said non-subscribing users, to get access, via the femto RBS, to the wireless communications network, and where said controlling access comprises:
allowing said non-subscribing users to get access to said wireless communications network using said allocated bandwidth, and
prohibiting said non-subscribing users to get access, via the femto RBS, to the wireless communications network, if said calculated bandwidth is less than or equal to zero.

11. A radio network control node of a wireless communications network, used for controlling bandwidth and controlling access in a femto cell served by a femto radio base station (RBS), said femto RBS being connected to the wireless communications network, the radio network control node comprising:
acquiring means for acquiring information on an available bandwidth measured between the femto RBS and a network node connected to the wireless communications network, and information on a bandwidth purchased by at least one subscribing user in the femto cell;
calculating means for calculating, based on the acquired information, a bandwidth that the wireless communications network, via the femto RBS, is able to provide to non-subscribing users in the femto cell; and
controlling means for controlling the bandwidth and to control access in the femto cell based on information on the calculated bandwidth.

12. The radio network control node according to claim 11 where said acquiring means for acquiring from said femto RBS, said information on the available bandwidth and said information on the purchased bandwidth comprises:
means for acquiring at least information on an Internet Protocol (IP) bandwidth purchased by said at least one subscribing user to get access to an IP network.

13. The radio network control node according to claim 12 where said calculating means calculates the bandwidth that the wireless communications network is able to provide users in the femto cell, by taking a difference between the measured available bandwidth and the purchased bandwidth.

14. The radio network control node according to claim 13 where said acquiring means is further configured to acquire from another network node or from an access control database (ACDB) node of the wireless communications network, information on a bandwidth purchased by said at least one subscribing user to get access, via the femto RBS, to the wireless communications network.

15. The radio network control node according to claim 14 where said calculating means is further configured to calculate a bandwidth that can be allocated to the non-subscribing users by taking a difference between said bandwidth that the wireless communications network is able to allocate to users in the femto cell and said bandwidth purchased by said at least one subscribing user to get access, via the femto RBS, to the wireless communications network.

16. The radio network control node according to claim 15, further comprising:
means for transmitting, to said femto RBS, said information on said calculated bandwidth and information on the bandwidth purchased by said at least one subscribing user to get access, via the femto RBS, to the wireless communications network.

17. The radio network control node according to claim 16 where said controlling means is to allocate said calculated bandwidth to said non-subscribing users and is further to allow said non-subscribing users to get access to said wireless communications network, via said femto RBS, by informing said femto RBS of said calculated bandwidth.

18. The radio network control node according to claim 17 where said controlling means is to allocate the calculated bandwidth to said non-subscribing users to get access, via the femto RBS, to the wireless communications network, and is further to control access by allowing said non-subscribing users to get access to said wireless communications network using said allocated bandwidth and prohibit said non-subscribing users to get access, via the femto RBS, to the wireless communications network, if said calculated bandwidth is less than or equal to zero.

* * * * *